United States Patent
Gregg

(10) Patent No.: US 6,183,582 B1
(45) Date of Patent: Feb. 6, 2001

(54) METHOD AND APPARATUS FOR PRODUCING SYNCHRONOUS BELTS WITH TWO OR MORE TRACKS OF HELICAL TEETH

(75) Inventor: Michael John William Gregg, Lincoln, NE (US)

(73) Assignee: The Goodyear Tire & Rubber Company, Akron, OH (US)

( * ) Notice: Under 35 U.S.C. 154(b), the term of this patent shall be extended for 0 days.

(21) Appl. No.: 09/194,418

(22) PCT Filed: Aug. 22, 1996

(86) PCT No.: PCT/US96/13588

§ 371 Date: Nov. 27, 1998

§ 102(e) Date: Nov. 27, 1998

(87) PCT Pub. No.: WO98/07561

PCT Pub. Date: Feb. 26, 1998

(51) Int. Cl.[7] ............... B29D 29/08; F16G 1/28
(52) U.S. Cl. .......... 156/138; 425/28.1; 425/34.2; 474/205; 474/250
(58) Field of Search ............... 156/137, 138, 156/142; 425/194, 471, 28.1, 34.1, 34.2, 34.3, 46; 474/205, 250

(56) References Cited

U.S. PATENT DOCUMENTS

| | | | |
|---|---|---|---|
| 2,600,775 | 6/1952 | Hurry et al. ............... | 18/34 |
| 2,709,277 | * 5/1955 | Dixon et al. ............ | 425/34.2 |
| 2,983,637 | * 5/1961 | Schmidt ................. | 156/138 |
| 3,078,205 | * 2/1963 | Sauer et al. ............. | 156/137 |
| 3,078,206 | 2/1963 | Skura .................... | 156/140 |
| 3,565,984 | 2/1971 | Sauer .................... | 264/160 |
| 3,784,338 | * 1/1974 | Previati ................. | 425/34.2 |
| 4,311,474 | * 1/1982 | Standley ................. | 156/137 |
| 4,504,342 | * 3/1985 | Marsh et al. ............ | 156/138 |
| 5,209,705 | 5/1993 | Gregg .................... | 474/204 |
| 5,320,516 | * 6/1994 | Moitzfeld ............... | 425/406 |
| 5,653,655 | * 8/1997 | Onoe et al. ............. | 474/205 |
| 5,733,399 | * 3/1998 | Wood .................... | 156/138 |

FOREIGN PATENT DOCUMENTS

| | | | |
|---|---|---|---|
| 3133820 | * 3/1983 | (DE) ................. | 425/28.1 |
| 0064576 | 11/1982 | (EP) . | |
| 1247809 | 10/1960 | (FR) . | |
| 2089305 | 12/1971 | (FR) . | |
| 2088277 | 12/1980 | (GB) . | |
| WO91/04145 | 4/1991 | (WO) . | |

* cited by examiner

Primary Examiner—Steven D. Maki
(74) Attorney, Agent, or Firm—Roger D Emerson; Emerson & Associates

(57) ABSTRACT

A method of producing synchronous belts having two or more tracks of teeth extending obliquely from the belt. The method includes forming an internal drum mold from a series of concentric rings, building a belt sleeve around the drum mold, vulcanizing the belt assembly, cutting the belt sleeve into widths and removing drum rings from the belt sections.

8 Claims, 5 Drawing Sheets

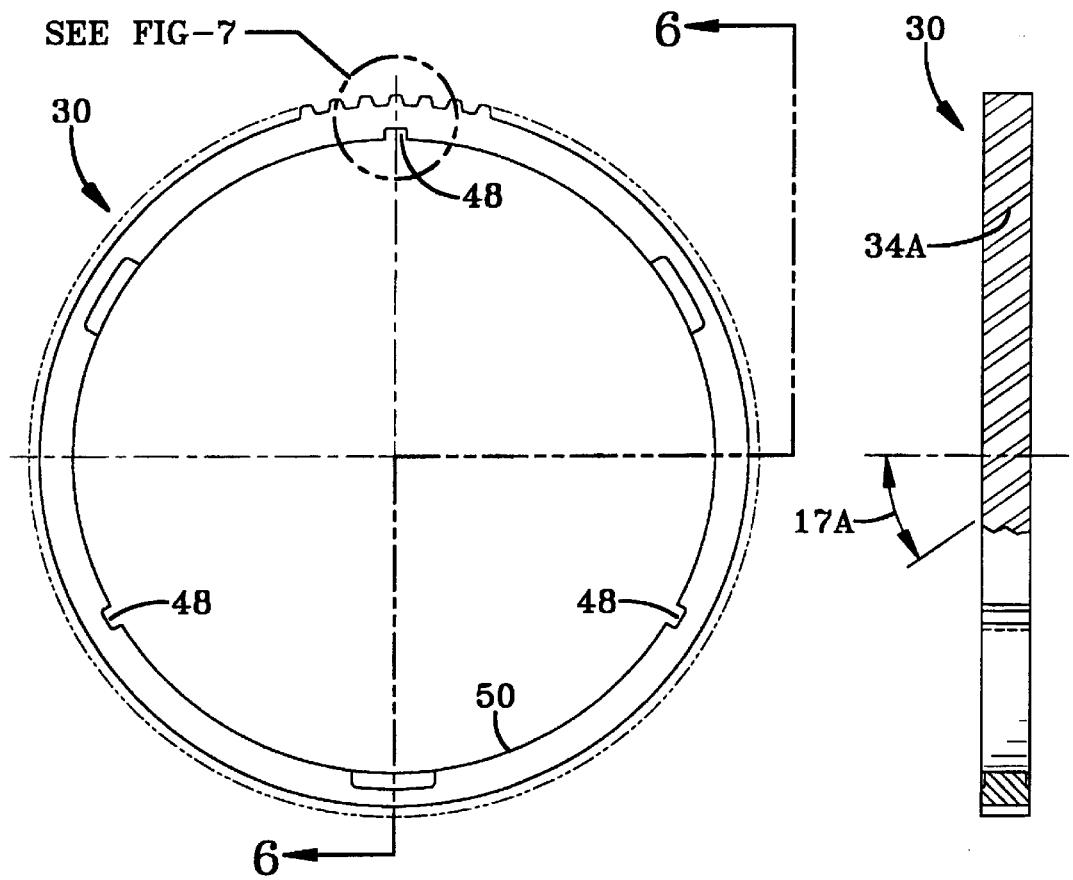
FIG-5
FIG-6
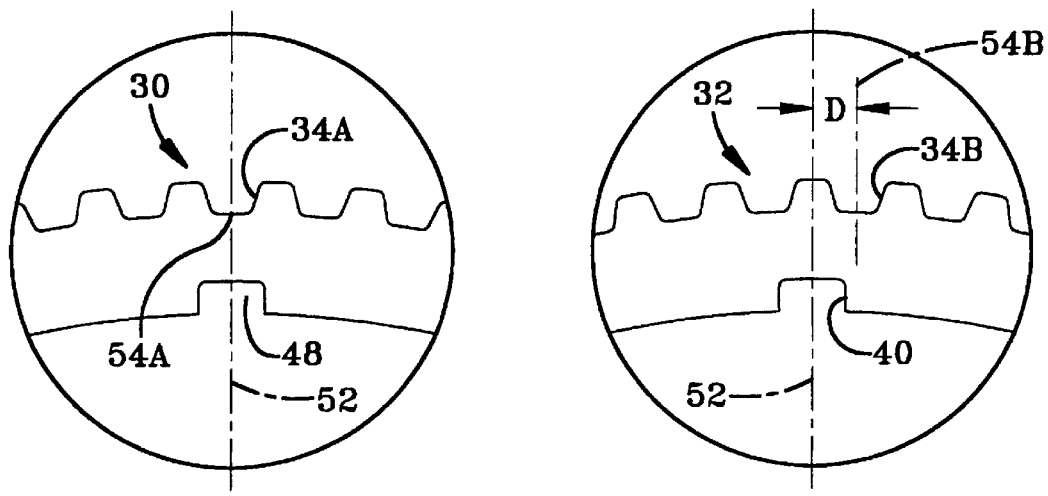
FIG-7
FIG-8

METHOD AND APPARATUS FOR PRODUCING SYNCHRONOUS BELTS WITH TWO OR MORE TRACKS OF HELICAL TEETH

TECHNICAL FIELD

This invention relates to synchronous drive belts and timing belts and more specifically to a method and apparatus for manufacturing a synchronous drive belt having two or more tracks of teeth which extend from the belt surface at oppositely balanced oblique angles.

BACKGROUND ART

U.S. Pat. No. 5,209,705 to Gregg ostensibly discloses a synchronous drive belt with oblique and offset teeth.

U.S. Pat. No. 3,078,206 to Skura ostensibly discloses a method of forming belt teeth and reinforced positive drive belts.

U.S. Pat. No. 2,600,775 ostensibly discloses a method and apparatus for making and curing power transmission belts.

Finally, Japanese Patent No. 59-133,034 is also directed to a method of manufacturing a synchronous drive belt.

Synchronous drive belts generally comprise a resilient elastomer reinforced with a longitudinal tensile member made up of a plurality of cords of a high elastic modulus. The cords may be made from glass fiber, carbon fiber, steel, polyester, high tenacity rayon or preferably, polyamide.

The tooth surface of the belt may be reinforced with an abrasion resistant fabric, one example of which is nylon.

The elastomers may be any one of those known to be suitable for use in such belts, including polychloroprene, polyurethane, NBR, IIR, IR, SBR, CSM, EPDM, other thermosets, thermoplastic elastomers and other polymer alloys.

Typically, synchronous drive belts are manufactured by winding layers of fabric, unvulcanized elastomer and cord on a drum. The drum functions as an internal mold and may have a periphery consisting of axially oriented evenly pitched grooves. During vulcanization, the belt slab is molded by pressure exerted by an external diaphragm or autoclave which forces the slab radially inwardly against the drum periphery. After vulcanization, the belt sleeve is slid axially off the drum or mold. The sleeve is then slit transversely into individual belts in a separate operation.

The synchronous belts so formed normally have a single track of teeth extending from the belt at right angles to the belt circumference, the teeth having dimensions compatible with the grooves on the drum periphery. A simple grooved drum is utilized in the manufacture of such belts.

It is known in the art to provide synchronous belts having at least two transversely adjacent rows of teeth which are at oppositely balanced oblique angles to the direction of the belt. One such belt structure is disclosed in U.S. Pat. No. 5,209,705 the disclosure of which is incorporated herein by reference. The belt structure disclosed therein provides certain advantages, especially relating to noise, which offer improvements over belts having a single track of teeth which extend at right angles to the belt circumference.

A problem encountered in the art, however, is the ability to manufacture the improved belts by a method that allows the building and vulcanization of a band having more than one belt section on an internal drum mold. The presence of the two or more tracks of teeth extending at oppositely balanced oblique angles on each belt section bars the cured belt sleeve from being slid axially off the drum mold, as is done in the prior art manufacturing method described above. Heretofore there has not been a viable method of manufacture of the improved belts.

The inventive process described herein provides a method whereby a synchronous belt having two or more tracks of teeth extending at oppositely balanced oblique angles may be advantageously manufactured in a way that is simple and effective.

DISCLOSURE OF INVENTION

In accordance with the practice of the present invention, there is provided a method of manufacturing a synchronous drive belt having teeth extending from a belt surface which comprises the steps of:

assembling an internal drum mold having a first set of concentric molding rings comprising adjacent right hand and left hand rings, the right and left hand rings having teeth-forming grooves therein, the grooves on each of the right and left hand rings being separated by a pre-determined pitch;

building a multi-plied belt band around the drum mold;

curing the belt band;

segmenting the cured belt band into belt widths; and, removing the belt widths from the mold after segmenting the belt band into widths.

In accordance with another aspect of the invention, the grooves of the right hand ring are obliquely angled relative to a longitudinal direction and the grooves of the left hand ring are oppositely angled to the grooves of the right hand ring. In the inventive method, the step of assembling the internal drum mold comprises:

positioning the right hand ring in a predetermined position relative to the left hand ring such that the grooves on the right hand ring are offset from the grooves on the left hand ring by a predetermined distance; and, employing holding means for holding the right hand ring in the predetermined position relative to the left hand ring.

In accordance with another aspect of the invention, the step of building a multi-plied belt band around the drum mold comprises:

laying a first fabric ply against the internal drum mold;

positioning a longitudinal tensile member over the fabric ply;

layering an elastomeric material over the tensile member; and, layering a transverse reinforcement member over the elastomeric material.

In accordance with another aspect of the invention, the step of assembling the internal drum mold further comprises:

placing a spacer ring between first and second sets of molding rings.

In accordance with another aspect of the invention, the step of segmenting the cured belt band into belt widths comprises:

mounting the drum mold assembly onto a lathe; and, cutting the cured belt band on either side of the first molding ring set.

According to another aspect of the invention, the step of removing the belt widths from the mold after the step of segmenting the belt band into widths comprises:

sliding the right hand ring away from the belt width in a first direction; and, sliding the left hand ring away from the belt width in a second direction.

One advantage of the present invention is the ability to effectively manufacture synchronous belts having two or more adjacent rows of obliquely angled teeth.

Another advantage of the present invention is the ability to vary the number of synchronous belts made in one curing operation.

Another advantage of the present invention is the precision with which the angled teeth of a finished belt can be produced.

A Another advantage of the present invention is the replaceability of drum sections which may be damaged or become out of desired tolerance during operation.

Another advantage of the present invention is the ability to incorporate portions of conventional belt building methods to form an improved belt structure.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and herein:

FIG. 5 is a side view of a molding ring used in accordance with the method of the present invention.

FIG. 6 is a front view partly in section taken along the line 6—6 of FIG. 5.

FIG. 7 is a blow up of a section of a right hand molding ring used in accordance with the method of the present invention.

FIG. 8 is an enlarged view of a section of a left hand molding ring used in accordance with the method of the present invention.

DETAILED DESCRIPTION OF THE INVENTION

Figure 1:
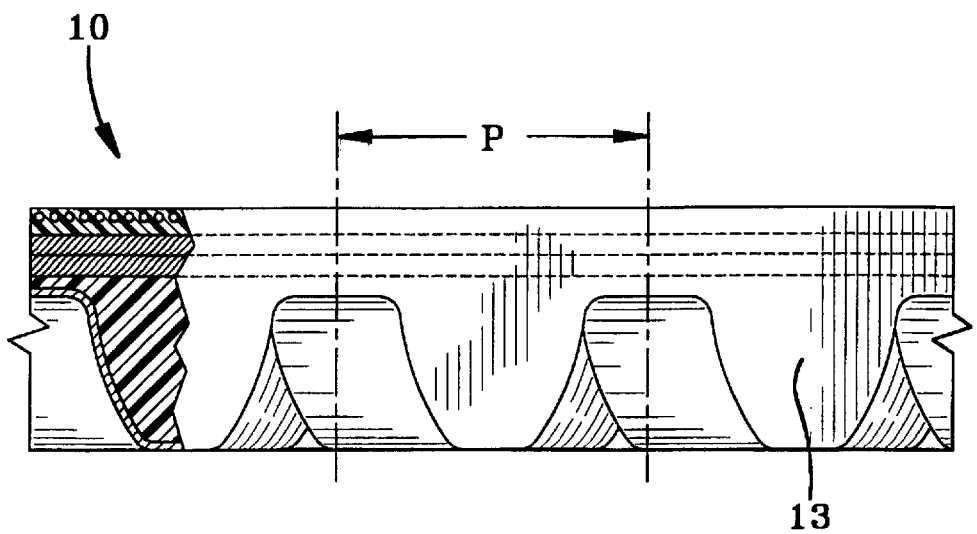
FIG. 1 is a bottom plan view of a portion of a synchronous drive belt produced by the method of the present invention.
Figure 2:
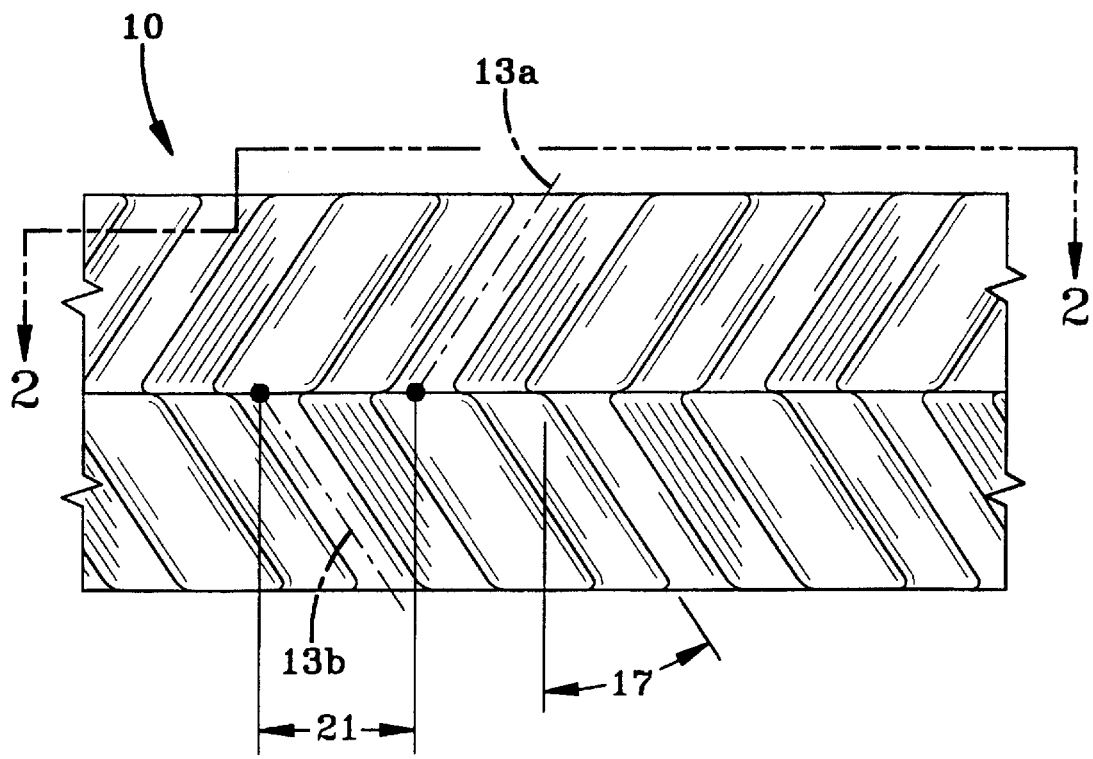
FIG. 2 is a side view partly in section taken along line 2—2 of FIG. 1.
Figure 3:
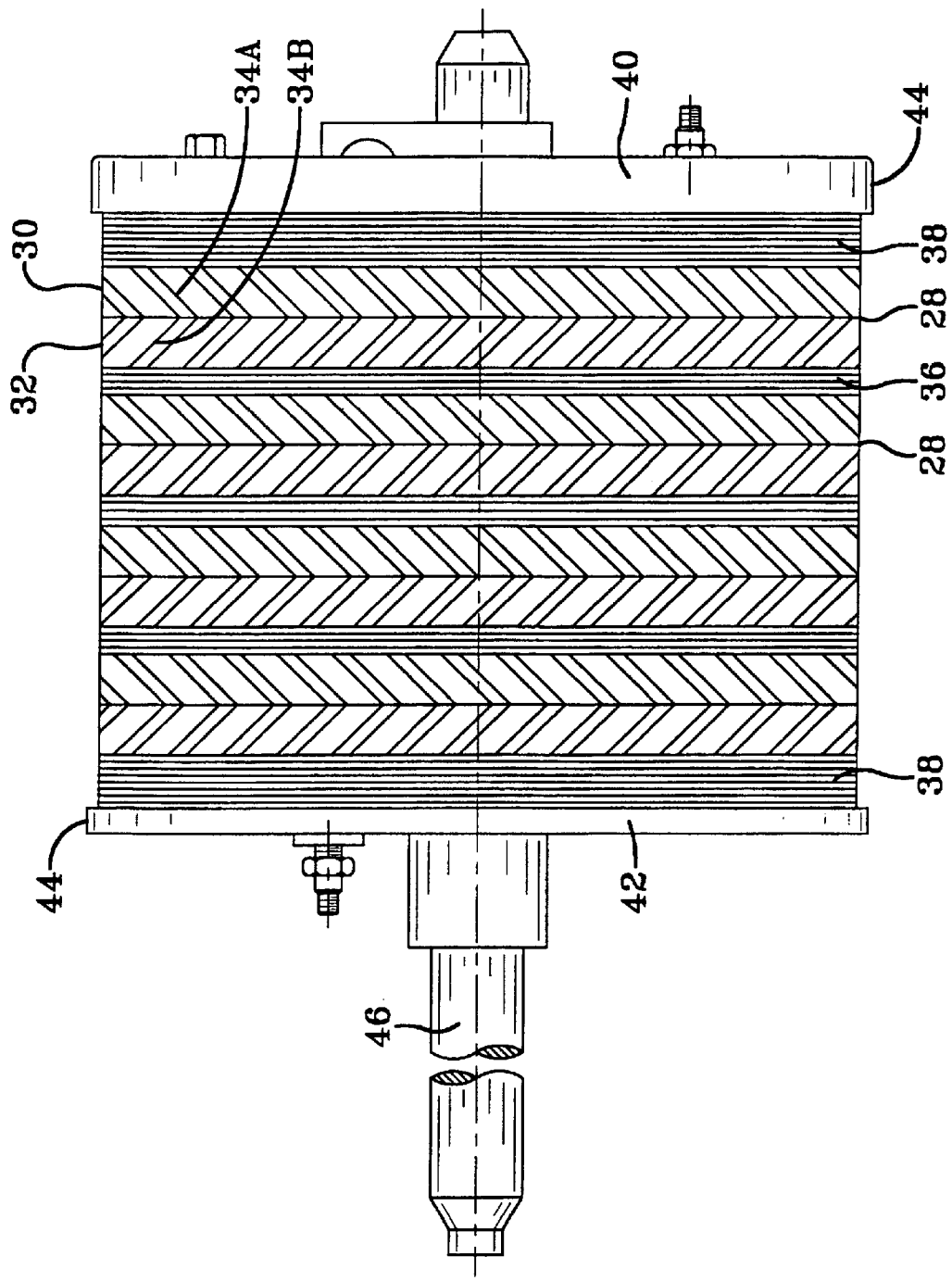
FIG. 3 is a drum mold assembly used in accordance with the method of the present invention.

Referring now to the drawings wherein the showings are for purposes of illustrating a preferred embodiment of the invention only and not for purposes of limiting the same, FIGS. 1 and 2 show a belt 10 such as the type manufactured in accordance with the inventive method. The belt 10 has at least two transversely adjacent rows of teeth 13, having centerlines 13a and 13b. The teeth are uniformly spaced apart in the longitudinal direction by their pitch P and extend obliquely to the longitudinal direction such that the teeth 13 in the transversely adjacent rows are at oppositely balanced angles 17 and the centerlines 13a and 13b are offset from each other by a distance 21 of from 10% to 90% of the pitch P. Optimally, the offset distance is 50% of the pitch P. The oblique angle 17 can range from 15° to 45°.

According to the inventive method, a drum mold 24 is assembled in order to form the belt 10. With reference to FIGS. 3–6, the drum mold 24 comprises at least one ring set 28. Each ring set 28 will form one synchronous belt 10. Each ring set 28 comprises a right hand ring 30 and a left hand ring 32. Right hand and left hand refer to the direction of the helical grooves 34A, 34B formed on the peripheral surfaces of the rings 30, 32. The helical grooves 34A on the right hand ring 30 will form one track of obliquely extending teeth 13 of the finished belt 10 whereas the helical grooves 34B on the left hand ring 32 will form the adjacent track of obliquely extending teeth 13 of the finished belt 10. Because the grooves 34A and 34B are oppositely angled, the teeth 13 formed thereby exhibit the oppositely balanced teeth of the improved belt structure.

The drum mold 24 may comprise more than one ring set 28. Successive ring sets 28 may be separated by center blank rings 36 which act as spacers. Adjacent the outermost edges of the ring sets 28 may be positioned end ring blanks 38. Finally, bottom and top end rings 40 and 42, respectively, may be placed at the ends of the drum mold 24. The bottom and top end rings 40, 42 may provide flanges 44 for the drum mold 24 to assist in the belt building process.

In a preferred embodiment, each drum mold 24 comprises four ring sets 28, spaced from each other by three center blank rings 36. The grooves 34A, 34B on successive ring sets 28 form a series of chevron shaped grooves around the drum mold 24. In the preferred embodiment, the right hand, left hand, center blank, and end blank rings 30, 32, 36, 38 comprise aluminum alloy, although other material may be employed.

The positioning of the grooves 34A of the right hand ring 30 relative to the grooves 34B of its mating left hand ring 32 is crucial in order to maintain the proper distance 21 of the finished belt 10. Therefore, the rings 30, 32, 36, 38, 40, 42 which form the drum mold 24 may include holding means for holding the proper positioning therebetween. For instance, the rings 30, 32, 36, 38, 40, 42 may comprise interlocking grooves or registers on their upper and lower faces (not shown) such that the rings may be stacked and remain concentric and properly positioned.

Figure 4:
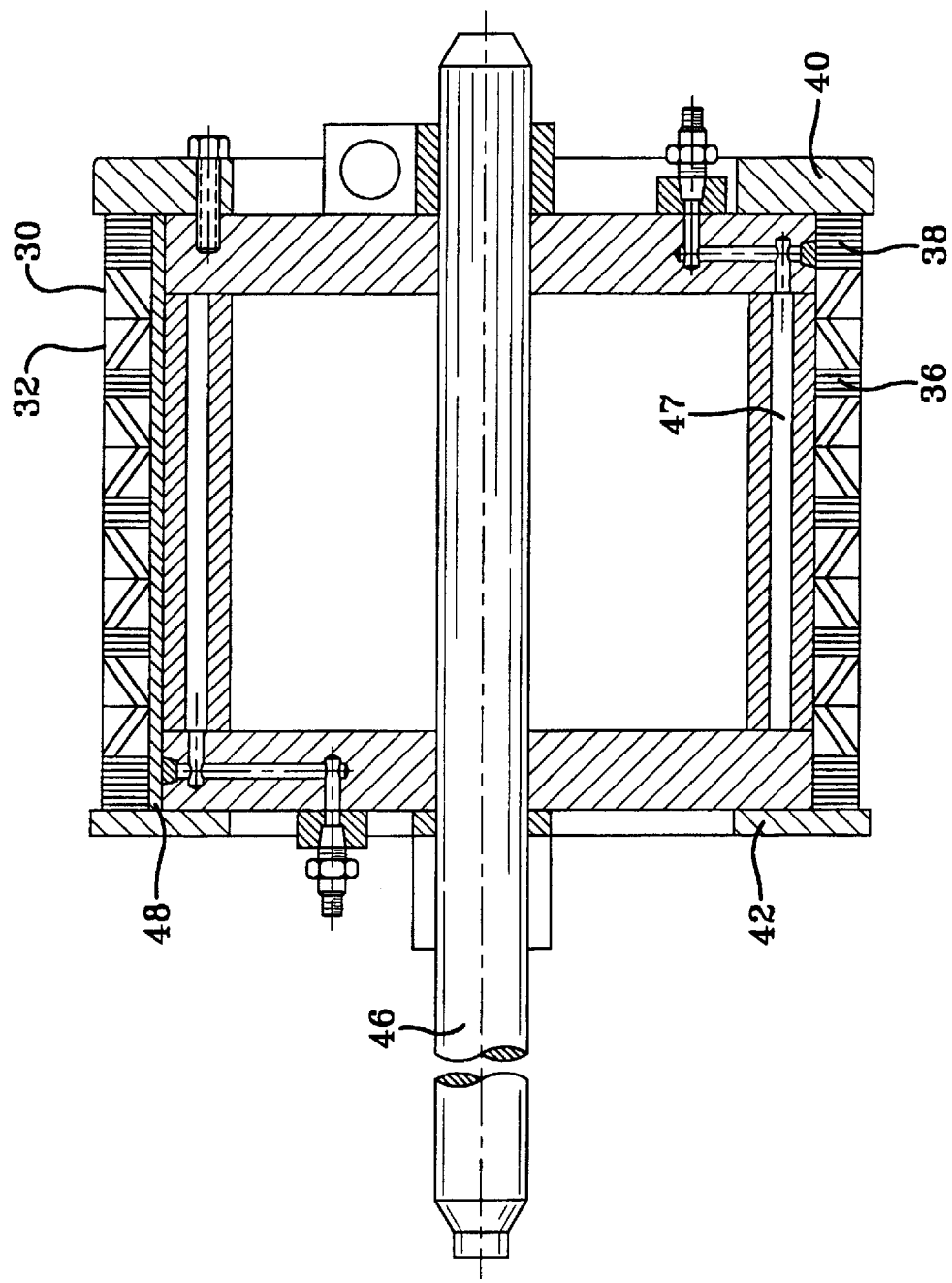
FIG. 4 is a cross-sectional view of the drum mold assembly taken along the line 4—4 of FIG. 3.

With particular reference to FIG. 4, a cross sectional view of a preferred embodiment of the drum mold 24 is shown. The successive rings 30, 32, 36, 38, 40, 42 are mounted on a central shaft 46 to permit rotation of the drum mold 24 while a belt band is being built thereover. The presence of the central shaft 46 also allows the drum mold 24 to be rotated on equipment while the cured belt band is being segmented into belt widths. The preferred embodiment also comprises an internal annular channel 47 to allow steam heating of the drum mold 24.

The successive rings 30, 32, 36, 38, 40, 42 are held in proper relation by the presence of one or more keyways 48. As more clearly shown in FIG. 5, there are three keyways 48 in a preferred embodiment of the drum mold 24. The keyways 48 are equally spaced around the internal surface 50 of each ring. A dowel (not shown) may be inserted into keyway 48.

In FIG. 6, a right hand ring 30 is shown partly in plan and partly in section. The helical grooves 34A make an oblique angle 17A which corresponds to the oblique angle 17 formed by the teeth 13 of the finished belt 10. The helical grooves of a left hand ring (not shown) make an oppositely balanced oblique angle.

Referring now to FIGS. 7 and 8, the relationship of the keyway 48 with the grooves 34A, 34B of mating right hand ring 30 and a left hand ring 32 is shown. In a preferred embodiment, the centerline 52 of a keyway 48 is aligned with the centerline 54A of a groove 34A on a right hand ring 30. The centerline 52 of the keyway 48 on the mating left hand ring 32 is offset from the centerline 54B of groove 34B by a distance D that will determine distance 21 of the belt 10 formed using the drum mold 24. In a preferred embodiment, the distance D is 40% to 60% of the pitch P. It is understood that the presence of a keyway 48 is only one holding means for holding the right hand ring 30 in proper relationship to its mating left hand ring 32 and other holding means may be employed. It is, however, a crucial element of the invention, that the grooves 34A and 34B of mating right and left hand rings 30, 32 be offset a given distance D in order to provide the offset teeth 13 of the finished belt 10.

Figure 9:
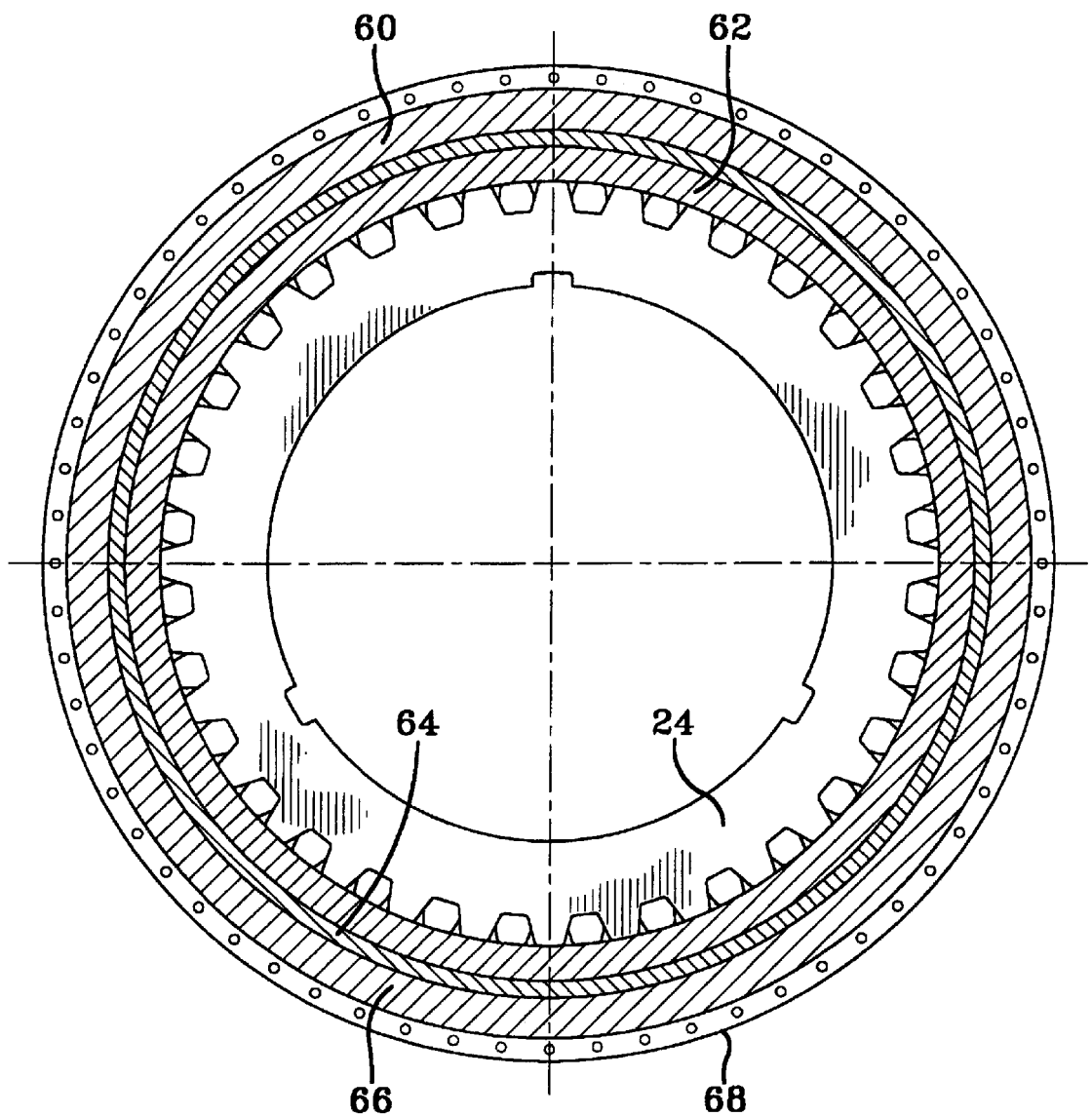
FIG. 9 is a sectional view of an uncured belt band built in accordance with the method of the present invention.

With reference to FIG. 9, the inventive method includes building a belt band 60 around the internal drum mold 24. The inventive method may include conventional construction methods which utilize a fabric teeth jacket 62 laid against the periphery of the drum mold 24, followed by a longitudinal tensile member 64, and an elastomeric material 66 to form the body of the belt 10. In addition, one embodiment of the inventive method includes adding a transversely laid reinforcement member 68 on the outside of the band 60. The inclusion of the transverse reinforcement member 68 allows the finished belt 10 to absorb internal side forces created within the two rows of teeth 13.

After the band 60 is built, it is then cured by means that are typical in the art. One such curing means may be to place the built assembly in a can containing a diaphragm. Pressure is applied to the diaphragm and the belt band 60 is heated in order to mold and vulcanize the material. Alternately, a free diaphragm in an autoclave may be used.

After cure, the belt band 60 is not axially slid off the drum mold 24, as is typical in prior art methods of producing synchronous belts. In the inventive method, the cured belt band 60 is maintained on the drum mold 24. The drum mold 24 is placed on equipment similar to a lathe and the cured belt band 60 is cut into separate widths. The cuts are made into the cured belt band 60 over the center blank rings or spacers 36.

Because the center blank rings 36 and the end ring blanks 38 are not helically grooved, they are easily slid away from the belt widths. The right hand ring 30 is moved away from the belt width in a first direction, and the left hand ring 32 is moved away from the belt width in a second, opposite direction. In that way, the right hand ring 30 is removed in a direction compatible with the belt teeth 13 formed therewith, and the left hand ring 32 is removed in a direction compatible with the belt teeth 13 formed therewith.

Following the removal of all the ring sections, the lateral edges of the individual belt widths can be trimmed to their finished width.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of producing a synchronous drive belt (10) having teeth extending from a belt surface, comprising the steps of:

assembling an internal drum mold (24), said internal drum mold having a first set of concentric molding rings (28), said first set of molding rings comprising adjacent right hand and left hand rings (30, 32), said right and left hand rings having teeth-forming grooves (34A, 34B) therein, said grooves on each of said right and left hand rings being separated by a pre-determined pitch (P);

building a multi-plied belt band (60) around an internal drum mold (24);

curing said belt band;

segmenting said cured belt band into belt widths while said belt band is positioned on said internal drum mold; and removing said belt widths from said mold after said step of segmenting said belt band into belt widths wherein said step of removing belt widths comprises sliding said right hand ring away from a belt width in a first direction and sliding said left hand ring away from said belt width in a second direction.

2. The method of claim 1 further comprising trimming said belt widths on either lateral edge to a predetermined dimension.

3. The method of claim 1 wherein said grooves of said right hand ring are obliquely angled relative to a longitudinal direction and said grooves of said left hand ring are oppositely angled to said grooves of said right hand ring, and wherein said step of assembling said internal drum mold comprises:

positioning said right hand ring in a predetermined position relative to said left hand ring such that said grooves on said right hand ring are offset from said grooves on said left hand ring by a predetermined distance; and, employing holding means for holding said right hand ring in said predetermined position relative to said left hand ring.

4. The method of claim 3 wherein said predetermined distance is between 40% and 60% of said pitch.

5. The method of claim 3 wherein said right hand and left hand rings each further comprise an internal surface, each of said internal surfaces having a longitudinal channel therein, said channels forming a keyway when said right hand ring is located in said predetermined position relative to said left hand ring, and wherein employing said holding means comprises:

inserting a dowel through said keyway.

6. The method of claim 1 wherein said internal drum mold further comprises a second set of molding rings essentially similar to said first set of molding rings, and a first spacer ring, and wherein said step of assembling said internal drum mold further comprises:

placing said spacer ring between said first and second sets of molding rings.

7. The method of claim 1 wherein said step of building said multi-plied belt band around said drum mold comprises:

laying a first fabric ply (62) against said internal drum mold;

positioning a longitudinal tensile member (64) over said first fabric ply;

layering an elastomeric material (66) over said tensile member; and, layering a transverse reinforcement member (68) over said elastomeric material.

8. The method of claim 1 wherein said step of segmenting said cured belt band into belt widths comprises:

mounting said drum mold assembly onto an associated lathe; and, cutting said cured belt band on either side of said first molding ring set.

* * * * *